United States Patent [19]

Gilliland

[11] Patent Number: 5,136,139
[45] Date of Patent: Aug. 4, 1992

[54] PULSE MIG WELDER FOR WELDING THIN-WALLED COPPER-NICKEL PIPE

[76] Inventor: Malcolm T. Gilliland, 310 Pine Valley Rd., Marietta, Ga. 30067

[21] Appl. No.: 443,453

[22] Filed: Nov. 29, 1989

[51] Int. Cl.$^5$ .............................................. B23K 9/10
[52] U.S. Cl. ........................... 219/137 PS; 219/130.21;
219/130.51; 219/137.71
[58] Field of Search ........................ 219/130.21, 130.51,
219/137.71, 137 PS

[56] References Cited

U.S. PATENT DOCUMENTS

| | | | |
|---|---|---|---|
| 3,123,705 | 3/1964 | Logan | 219/137 PS |
| 4,973,821 | 11/1990 | Martin | 219/130.51 |

FOREIGN PATENT DOCUMENTS 58-187262  11/1983  Japan ............................ 219/130.21

*Primary Examiner*—Clifford C. Shaw
*Attorney, Agent, or Firm*—Jones, Askew & Lunsford

[57] ABSTRACT

A welding station for welding thin-walled copper-nickel pipe. An electronic welding station (10) has an output circuit (13) which provides arc welding power having the arc characteristics specified by a weld parameter selection circuit (12). A welding torch and feeder assembly (11) has a controller (20) which is responsive to a predetermined event, such as the passage of time since the start of the arc, or the average temperature of the pipe (25) as indicated by two temperature-measuring devices (30, 32). The controller (20) adjusts the wire feed speed, the pulse frequency, the pulse width, the welding voltage, the welding current and/or other parameters so as to cause the arc to have the parameters most desired for welding copper-nickel pipe. The present invention provides for a hotter arc for starting the welding operation, thereby obtaining good penetration and bonding, and a cooler arc for continuing the welding operation, thereby preventing burn-through of the pipe (25).

26 Claims, 4 Drawing Sheets

PULSE MIG WELDER FOR WELDING THIN-WALLED COPPER-NICKEL PIPE

TECHNICAL FIELD

The present invention relates to arc welders and, more particularly, to a pulse MIG welder for welding thin-walled copper-nickel pipe.

BACKGROUND OF THE INVENTION

Copper-nickel pipe is commonly used in ships because of its resistance to the corrosive effects of the salt air outside of the pipe and the corrosive effects of any salt water inside the pip. This copper-nickel pipe is generally thin walled and is subject to burn through if the welding temperature is too high. However, if the welding temperature is too low, the weld penetration and bonding will be inadequate, thereby necessitating that the weld be ground out and that portion of the joint be rewelded.

Tungsten inert gas (TIG) welding provides an arc which is concentrated on one spot. This allows the welding operator to cut the heat back and still maintain a good puddle and obtain good penetration and bonding. Metallic inert gas (MIG) welding provides an arc which is not as concentrated and therefore a high overall temperature is required in order to achieve a puddle which penetrates and bonds well to the pipe. If the welding power applied is too high, then the weld will penetrate through the joint. It is possible to cut the welding power down to the point where it is unlikely that the weld will penetrate through the pipe. However, in this case, the pipe will heat up very slowly, and the penetration and bonding may be inadequate for the first part of the weld. This requires grinding out the weld and rewelding the pipe.

Furthermore, if the welding operator should start off with a hotter weld, break the arc long enough to readjust the welding power, and then continue on the weld, the penetration on the first part of the restarted weld will generally be inadequate. This occurs because the heat conductivity of the pipe draws the heat away from the weld area very quickly. Therefore, when the welder continues the welding operation with the lower power, the degree of penetration and bonding will be inadequate and it will take a short amount of time before the pipe temperature heats up to the point where the degree of penetration and bonding is proper. Again, this causes a poor weld and that part of the weld must be ground out and that particular portion of the pipe rewelded. Because of the difficulties of MIG welding of copper-nickel pipe, TIG welding is preferred for this type of pipe, especially where out-of-position welding is being performed.

If the weld power could be controlled, so as to achieve adequate penetration at all times, while avoiding burning through of the pipe, MIG welding would be preferred over TIG welding because MIG welding operations proceed at five to six times the rate of TIG welding operations.

Therefore, there is a need for a MIG welder which provides a high starting power so as to achieve good penetration and bonding and then provides a lower, continuous welding power so as to prevent burning through the pipe.

Furthermore, there is a need for a MIG welder which monitors the temperature of the pipe and adjusts the welding power so as to achieve good penetration and bonding without burn-through.

SUMMARY OF THE INVENTION

The present invention is a welder which provides a high welding power when the weld is first started so as to quickly achieve good penetration and bonding and, after a predetermined amount of time, automatically cuts the welding power back to a point which continues to provide good penetration and bonding while preventing burn-through of the pipe. The present invention also is a welder which monitors the temperature of the pipe and automatically adjust the welding parameters in response to changes in the pipe temperature so as to provide good penetration and bonding while preventing burn-through.

In one embodiment of the present invention, the welding operator adjust the controls on a welding parameter selection circuit to provide the welding parameters desired for the particular welding operation to be performed. When the welding operator strikes the arc, a timer sends a signal to the welding parameter selection circuit which causes this circuit to provide welding parameters which correspond to a higher welding power. This provides for good penetration and bonding on arc starting. After a predetermined amount of time, the timer causes the welding parameter selection circuit to revert to the welding parameters selected by the welding operator so that welding is continued using welding parameters which provide for good penetration and boding while avoiding burn-through.

The present invention also provides for the welding parameters to be chanted at a predetermined rate of change from the welding parameters desired for the initial welding operation to the parameters desired for the continued welding operation. Each welding parameter may changed at a different rate from any other welding parameter and, furthermore, any particular rate of change may be a linear or a non-linear function of time.

The present invention also provides a welder which adjusts the welding parameters so as to maintain the pipe temperature within a temperature range which provides good penetration and bonding and avoids burn-through. The present invention uses temperature-sensitive devices to monitor the temperature of the pipe, preferably on both sides of the weld area. If the pipe temperature begins to rise the present invention cuts back on selected welding parameters so as to cause the pipe temperature to fall back within the desired temperature range. This prevents burn-through of the pipe. If the pipe temperature tends to decrease then the present invention changes selected welding parameters so as to increase the pipe temperature, thereby assuring good penetration of the weld and good bonding of the weld to the pipe. The selected parameters may vary linearly or non-linearly, as required, with respect to the pipe temperature. Furthermore, any parameter may vary in a manner which is different than any other parameter.

Therefore, it is an object of the present invention to provide a welder which provides a first set of welding parameters selected to cause rapid heating of the pipe for starting the welding operation and, in response to a predetermined event, such as the passage of a predetermined amount of time, provides a second set of welding parameters for continuing the welding operation.

It is another object of the present invention to provide a welder which provides a first set of welding parameters selected to cause rapid heating of the pipe for starting the welding operation and, in response to a predetermined event, such as the temperature of the pipe exceeding a predetermined threshold, provides a second set of welding parameters for continuing the welding operation.

It is another object of the present invention to provide a welder which monitors a selected condition, such as the pipe temperature, and adjusts the welding parameters so as to maintain the pipe temperature within a predetermined temperature range.

It is a further object of the present invention to provide a welder which maintains the temperature at the weld area within a predetermined range by adjusting the pulse frequency, the pulse width, the welding voltage, and/or the welding current.

DETAILED DESCRIPTION

Figure 1:
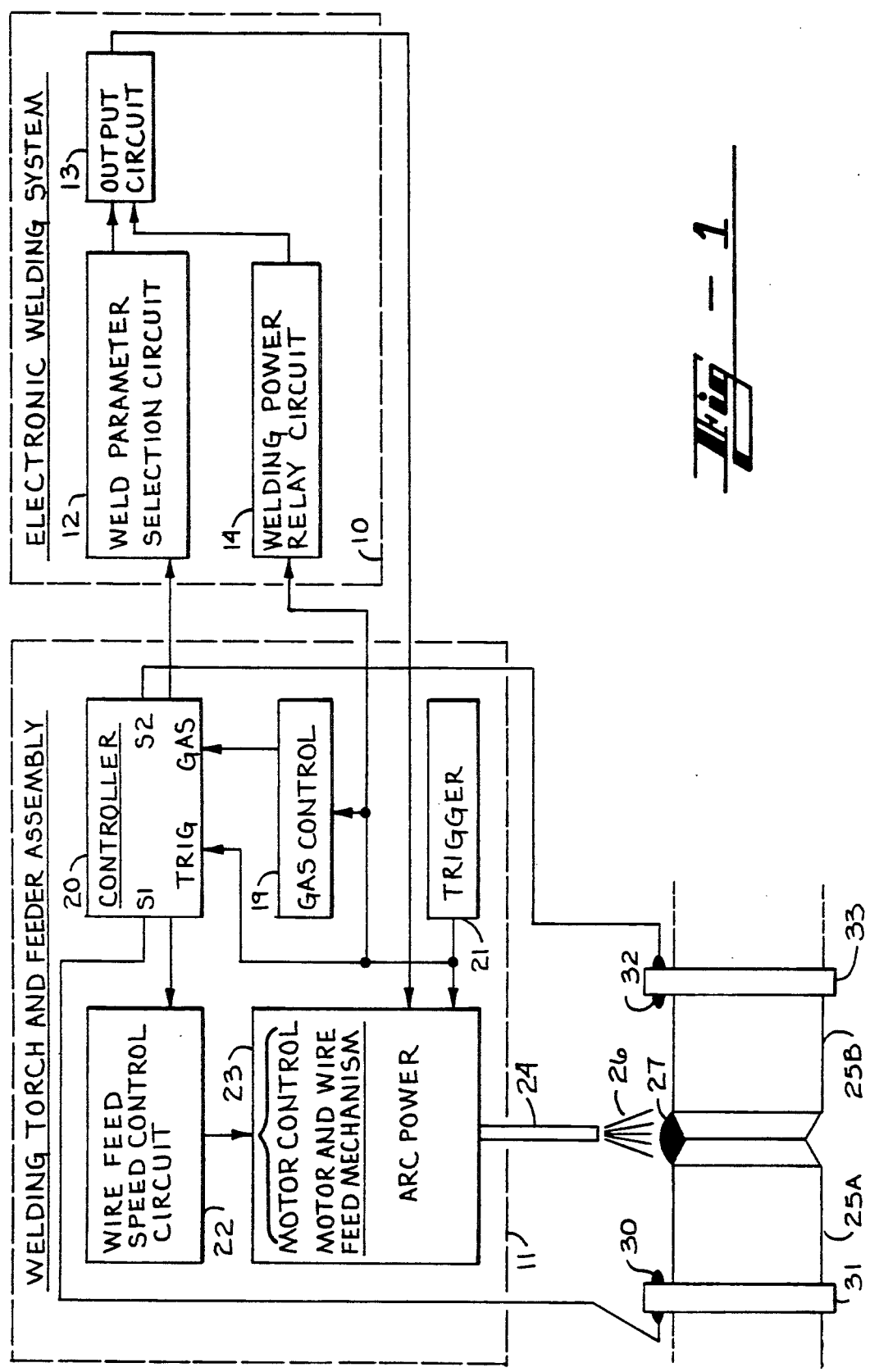
FIG. 1 is a block diagram of the preferred embodiment of the present invention.

Turn now to the drawing in which like numerals represent like components throughout the several figures. The present invention represents an improvement to electronic welding stations in general and, in particular, to the electronic welding stations described in U.S. Pat. No. 4,716,274, issued Dec. 29, 1987, entitled "Distributed Station Welding System", U.S. patent application Ser. No. 062,543, filed Jun. 12, 1987, entitled "Improved Arc Welding System", U.S. patent application Ser. No. 181,985, filed Apr. 15, 1988, entitled "Arc Welder With Improved Arc Striking Capability", and U.S. patent application No. 374,465, filed Jun. 30, 1989, entitled "Electronic Welding Station With AC and Reversible Polarity DC Outputs", the inventor of all of which is Malcolm T. Gilliland, and all of which are hereby incorporated herein by reference as if fully set forth herein.

FIG. 1 is a block diagram of the preferred embodiment of the present invention. The preferred embodiment comprises an electronic welding station 10, a welding torch and feeder assembly 11, and a power supply (not shown) for providing operating power to electronic welding station 10. Electronic welding station 10 comprises a weld parameter selection circuit 12, an output circuit 13, and a welding power relay circuit 14 for selectively providing operating power to output circuit 13. Weld parameter selection circuit 12 allows the welding operator to adjust the welding parameters so as to provide the arc characteristics most desirable for the particular welding operation to be performed. The welding parameters selected by the operator may include the pulse frequency, the pulse width, arc voltage, arc current, constant current or constant voltage modes, chopped or unchopped output, MIG or TIG, etc. Weld parameter selection circuit 12 provides drive signals to output circuit 13. Output circuit 13 steps up the drive signals provided by weld parameter selection circuit 12 so as to provide the output voltage and output current levels required for arc welding.

Welding torch and feeder assembly 11 comprises a controller 20, a trigger 21, a wire feed speed control circuit 22, and a motor and a wire feed mechanism 23. Trigger 21 is a conventional trigger on the welding torch and feeder assembly 11 which allows the welding operator to start or stop the welding operation. Wire feed speed control circuit 22 allows the welding operator to select the wire feed speed desired for the particular welding operation to be performed. Motor and wire feed mechanism 23 is responsive to speed control signals from wire feed speed control circuit 22 for controlling the speed at which wire 24 is fed from assembly 11.

Electronic welding station 10 and welding torch and feeder assembly 11 are used to weld together a first pipe 25A and a second pipe 25B. In the preferred embodiment, pipes 25A and 25B are copper-nickel pipe which may have bevelled ends (as shown) or straight ends (not shown). The arc 26 melts the wire 24 and causes a bead 27 to be deposited at the junction of pipes 25A and 25B. As stated above, if the temperature of pipes 25A and 25B is too low the penetration and the bonding of the weld will be inadequate and the bead 27 will have to be ground out and the welding operation performed again. Also, if the welding temperature is too high then the pipe will burn through and the pipe ends must be refinished before proceeding with the welding operation. It will be appreciated that, initially, the pipe will be an ambient temperature so a hotter arc should be used so as to quickly bring the pipe temperature up to the desired welding temperature. Copper-nickel pipe has a substantial heat conductivity so the heat applied to the immediate welding area quickly spreads to the surrounding pipe. Therefore, by the time the welding operation has travelled to a different point on the junction of the pipes, the temperature of the pipes will be substantially above the ambient temperature. If the hotter arc is allowed to continue the pipes will be burned through. Therefore, the arc power must be cut back so that burn-through is avoided.

Controller 20 controls the arc power and therefore the pipe temperature. When the welding operator first squeezes trigger 21 controller 20 causes weld parameter selection circuit 12 to increase the pulse frequency and the pulse width above that selected by the welding operator so as to provide a hotter arc. The hotter arc will cause wire 24 to be liquified and deposited more quickly so controlled 20 also causes wire feed speed control circuit 22 to increase the feed rate of wire 24. Once the pipes 25 have heated to the proper temperature then controller 20 causes weld parameter selection circuit 12 and wire feed speed control circuit 22 to revert to the parameters initially selected by the welding operator. This provides a cooler arc which is sufficient to obtain good penetration and good bonding while avoiding burn-through of the pipes 25. In one embodiment of the present invention, each time trigger 21 is squeezed, controller 20 causes the hotter arc to be provided for a predetermined amount of time and then automatically switches to the arc selected by the welding operator.

In another embodiment of the present invention controller 20 monitors the temperature of pipes 25A and 25B by a pair of temperature-measuring devices 30 and 32, such as thermistors. This allows controller 20 to more accurately determine the temperature of the pipes 25 so that switching from the initial, hotter arc to the cooler arc will occur at a point which is advantageous for producing a quality weld. In one embodiment of the present invention controller 20, via thermistors 30 and 32, determines an average temperature for pipes 25A and 25B. Controller 20 initially causes the hotter arc to be provided for the welding operation. Once the average temperature reaches a predetermined temperature then controller 20 causes the cooler arc to be provided. In addition, any time that the average temperature drops below another predetermined temperature, then controller 20 causes the hotter arc to be provided again. The first predetermined temperature may be high than the second predetermined temperature so that a hysteresis is provided which prevents controller 20 from rapidly alternating between the hotter arc and the cooler arc. The term "average" is used herein in a rough sense and includes, but is not limited to, the precise mathematical average of the two temperatures. The present invention contemplates the generation of an "average" temperature wherein one temperature is weighted more heavily than the other temperature so that the "average" temperature lies between the two temperatures.

The use of two thermistors is preferred since one of the pipes, for example pipe 25B, may be clamped, laying against a bulkhead, or in contact with some other mechanism which dissipates heat. If just a single thermistor is used, such as thermistor 30, then switching from the hotter arc to the cooler arc might occur before the temperature of the junction of pipes 25 had reached the optimum temperature, so that poor penetration and bonding could result. Similarly, if only thermistor 32 is used, then the temperature of the junction of pipes 25 may exceed the desired temperature to the point where burn-through occurs. However, even though two thermistors are preferred, it should be understood that the present invention encompasses the concept of using just one thermistor as well as the concept of using more than two thermistors. Thermistors 30 and 32 are held to pipes 25 by straps 31 and 33. Straps 31 and 33 are disposable straps, such as Teflon cable ties. Metal straps may be used if desired or required because of proximity to the weld.

In another embodiment of the present invention controller 20 monitors the average temperature of the pipes 25 via thermistors 30 and 32 so as to provide a hotter arc upon starting and then, as the temperature of the pipes 25 increases, changes the welding parameters in a manner so as to maintain the average temperature at a predetermined temperature. In this manner, controller 20 again causes the temperature of the junction of pipes 25 to be maintained at the temperature optimum for providing good penetration and good bonding while avoiding burn-through. In this and the preceding embodiment, a closed loop feedback configuration is provided.

In the first two embodiments, the transition from the hotter arc to the cooler arc may be an abrupt transition, that is, a step transition, may be a linear transition, or may be a non-linear transition. Furthermore, one welding parameter may make the transition in a different manner than another welding parameter. All of the embodiments have the same purpose: to provide a hotter arc for heating up the material to be welded so as to provide good penetration and good bonding and, thereafter, providing a cooler arc which still provides good penetration and good bonding while avoiding burn-through problems.

Figure 2:
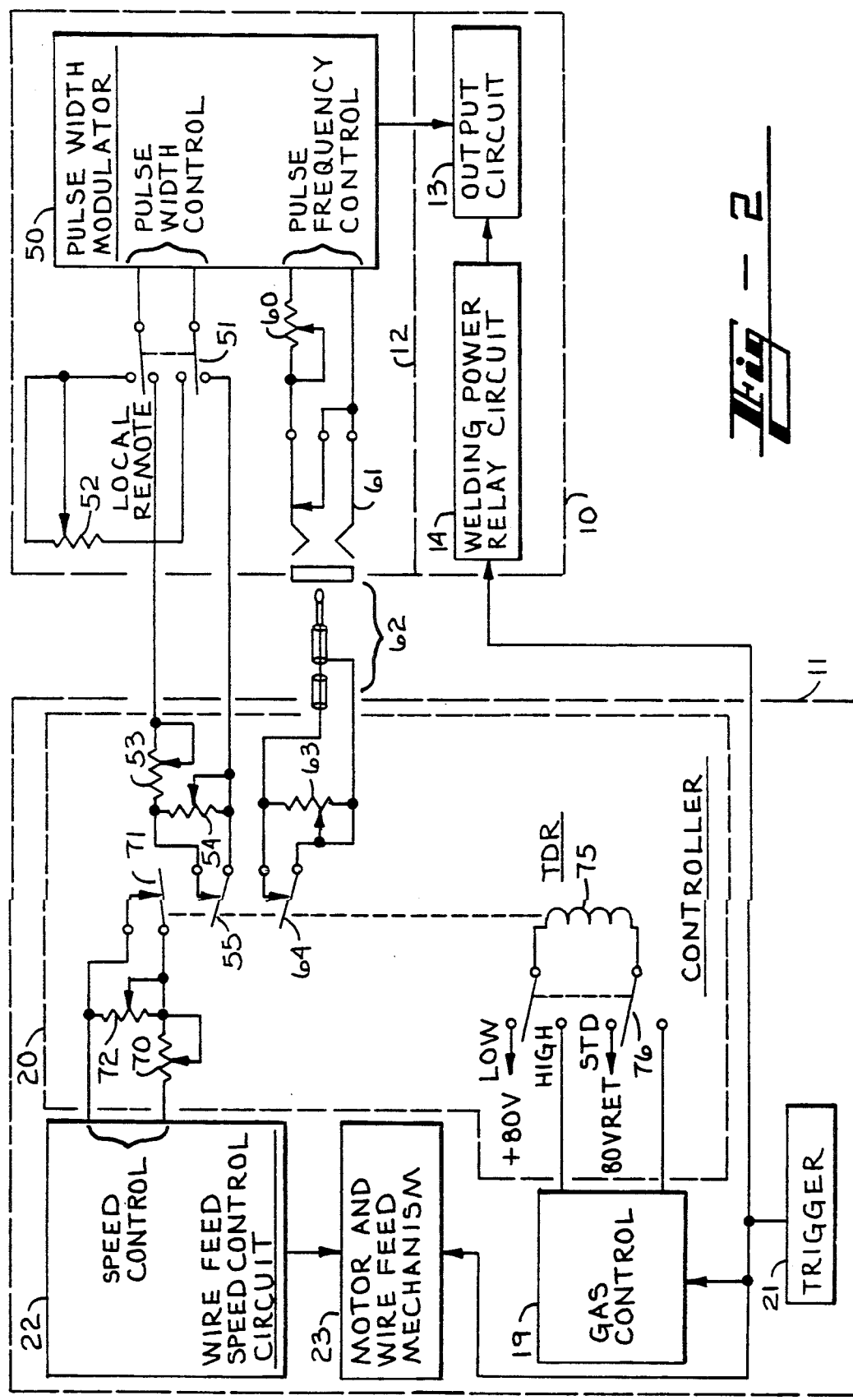
FIG. 2 is a schematic diagram of a first embodiment of the present invention.

FIG. 2 is a schematic diagram of a first embodiment of the present invention. Weld parameter selection circuit 12 includes a pulse width modulator circuit 50.

Pulse width modulator circuit 50 has two control inputs: a pulse width control, and a pulse frequency control. If switch 51 is in the LOCAL position, then potentiometer 52 controls the pulse width. If switch 51 is in the REMOTE position, then potentiometers 53 and/or 54 control the pulse width. Relay contacts 55 are normally closed contacts. Therefore, when switch 51 is in the REMOTE position, potentiometer 54 is bypassed by contacts 55 so that only potentiometer 53 controls the pulse width. Therefore, potentiometer 53 controls the pulse width for the hotter arc. When contacts 55 are opened, then potentiometers 53 and 54 control the pulse width for the cooler arc. In this embodiment, less resistance across the pulse width control input of pulse width modulator 50 causes modulator 50 to produce a larger pulse width.

Jack 61 is a shorting jack. If nothing is plugged into jack 61 potentiometer 60 controls the pulse frequency provided by pulse width modulator 50. However, if plug 62 is inserted into jack 61 the pulse frequency is also determined by potentiometer 63 and contacts 64. If contacts 64 are closed, then potentiometer 63 is bypassed and the frequency is controlled only by potentiometer 60. When contacts 64 are opened the pulse frequency for the cooler arc is determined by potentiometers 60 and 63. In this embodiment, less resistance across the frequency control input of pulse width modulator 50 causes modulator 50 to produce a higher pulse frequency.

The wire feed speed is determined by the resistance connected across the speed control input terminals of wire feed speed control 22. Initially, contacts 71 short out potentiometer 72 so that only potentiometer 70 controls the wire feed speed during the hotter arc. However, once contacts 71 open, then the wire feed speed for the cooler arc is determined by potentiometers 70 and 72. In this embodiment, a lower resistance across the speed control terminals causes speed control 22 to provide a higher wire feed speed.

Contacts 55, 64 and 71 are single pole, single throw, normally closed contacts. These contacts are part of a time delay relay (TDR) 75. The operation of relay 75 is controlled by switch 76 and by gas control circuit 19. Switch 76 is a two pole, double throw, center off switch. In the HIGH (center off) position switch 76 prevents relay 75 from being activated. Therefore, contacts 55, 64 and 71 bypass potentiometers 54, 63 and 72, respectively, so that the pulse width, pulse frequency, and wire feed speed, respectively, are controlled by potentiometers 53, 60 and 70, respectively. Potentiometers 53, 60 and 70 are therefore used to adjust the desired characteristics for the hotter arc. When switch 76 is in the LOW position, relay position 75 is energized so that, after the delay, contacts 55, 64 and 71 are opened. This allows potentiometers 54, 63 and 72 to affect the pulse width, pulse frequency, and wire feed speed, respectively. Therefore, potentiometers 54, 63 and 72 are sued to adjust the characteristics for the cooler arc. The HIGH and LOW positions are preferably used to adjust the arc characteristics and the STANDARD position is the operating position. When switch 76 is in the STANDARD position, relay 75 is connected to an output of the gas control circuit 19. When trigger 21 is squeezed and activates gas control circuit 19, then gas control circuit 19 applied 80 volts to relay 75. Initially, contacts 55, 64 and 71 remain closed so that a hotter arc is provided. After the delay time has passed contacts 55, 64 and 71 are opened so that the cooler arc is provided.

Figure 3:
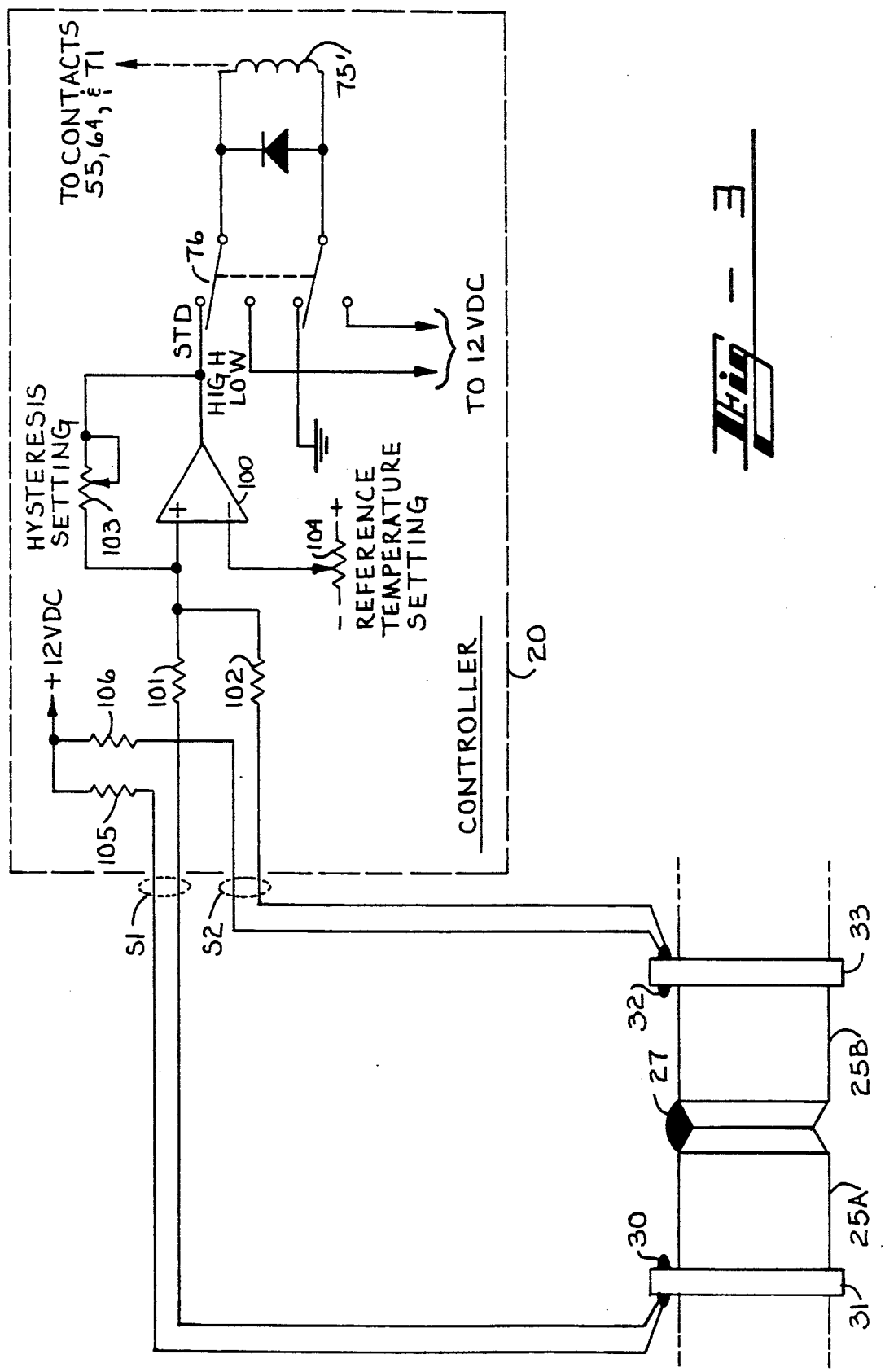
FIG. 3 is a schematic diagram of a second embodiment of the present invention.

FIG. 3 is a schematic diagram of a second embodiment of the present invention. In this embodiment, relay 75' is a standard relay, and not a time delay relay. Relay 75' controls contacts 55, 64 and 71 of FIG. 2. Switch 76, as in FIG. 2, provides LOW, HIGH, and STANDARD positions. These three positions perform the same functions as described in FIG. 2. However, instead of merely monitoring the passage of time, control 20 is responsive to the average temperature of pipes 25A and 25B. Thermistors 30 and 32 are connected to +12 volts through pull-up resistors 105 and 106 and to the non-inverting input of comparator 100 through resistors 101 and 102. The output of comparator 100 is connected by a hysteresis setting potentiometer 103 to the non-inverting input of comparator 100. The inverting input of comparator 100 is connected to a reference temperature setting potentiometer 104. The output of comparator 100 is connected, when switch 76 is in the STANDARD position, to relay 75'. Potentiometer 104 is used to set the reference temperature at which controller 20 will cause a transition from the hotter arc to the cooler arc. Potentiometer 103 is used to provide a hysteresis so that minor changes in the average temperature of pipes 25 do not cause controller 20 to switch back and forth between the hotter arc and the cooler arc.

When pipes 25 are an ambient temperature thermistors 30 and 32 will have a high resistance and the voltage at the non-inverting input of comparator 100 will be less than the voltage provided by the reference temperature setting potentiometer 104. Therefore, the output of comparator 100 will be low and relay 75' will not be energized. Contacts 55, 64 and 71 of FIG. 2 will therefore cause the higher pulse frequency, high pulse width, and higher wire feed speed to be provided, as required for the hotter arc. Once the welding operation has caused the temperature of pipes 25A and 25B to heat up, the resistance of thermistors 30 and 32 will decrease, thereby increasing the voltage at the non-inverting input of comparator 100 above the reference voltage. This causes the output of comparator 100 to go high and energize relay 75'. Relay 75' then opens contacts 55, 64 and 71, thereby causing the pulse frequency, pulse width, and wire feed speed to drop to a lower value appropriate for the cooler arc. However, if the cooler arc causes the average temperature to drop below the reference setting, after considering any hysteresis provided by potentiometer 103, then comparator 104 will de-energize relay 75', thereby causing the hotter arc to be provided again.

Figure 4:
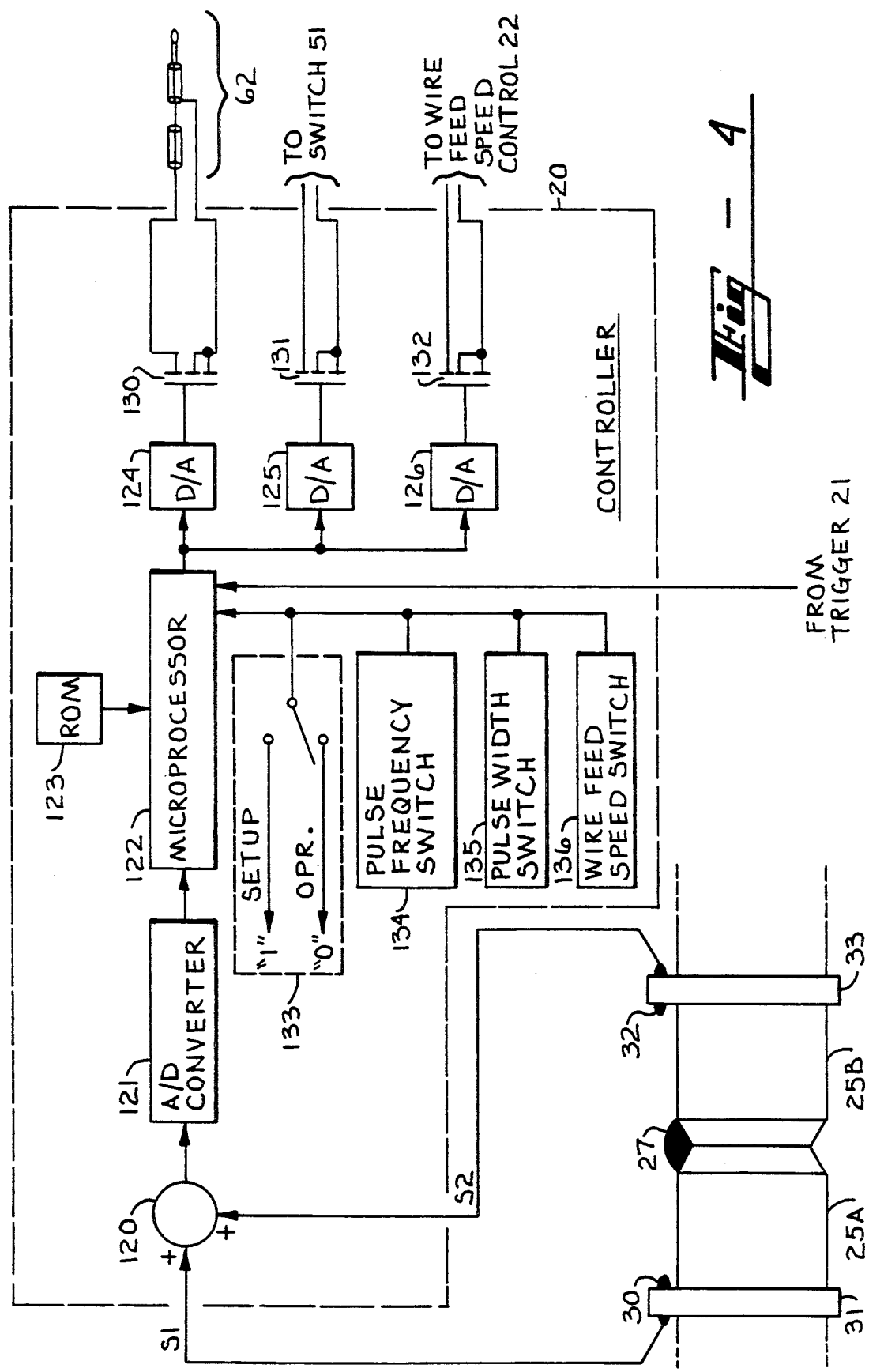
FIG. 4 is a schematic diagram of a third embodiment of the present invention.

Turn now to FIG. 4 which is a schematic diagram of the third embodiment of the present invention. In this embodiment, the outputs of thermistors 30 and 32 are summed in an adder 120 and then provided to an analog-to-digital (A/D) converter 121. Converter 121 converts the signals from adder 120 into a form suitable for use by a microprocessor 122. Microprocessor 122 determines the average temperature of pipes 25 by reading output of converter 121. Microprocessor 122 then uses this average temperature to determine the proper pulse frequency, pulse width, wire feed speed, or other necessary parameter, so as to obtain the arc characteristics and wire feed speed necessary to obtain a proper weld. Although the use of a lookup table is preferred, it will be appreciated that ROM 123 may contain an algorithm which allows microprocessor 122 to compute the proper pulse frequency, etc. Microprocessor 122 then, through digital-to-analog (D/A) converters 124, 125 and 126, changes the voltage on the gates of field effect transistors (FETs) 130, 131 and 132, respectively, so as to provide the pulse frequency, pulse width, and wire feed speed, respectively, necessary to provide a good weld. As the average temperature of pipes 25 increases controller 20 will cause the pulse frequency, pulse width, and wire feed speed to decrease, and, conversely, as the average temperature of pipes 25 decreases controller 20 will cause the pulse frequency, pulse width and wire feed speed to increase. Controller 20 therefore adjust the arc characteristics so as to maintain pipes 25 at the temperature optimum for welding and also adjusts the wire feed speed to match the rate of deposit of the welding bead.

Although the use of a microprocessor and lookup table are preferred, it will be understood that a microprocessor which executes an algorithm which defines the pulse frequency, pulse width, and wire feed speed as a function of the average pipe temperature can also be implemented. Furthermore, it will also be appreciated that, at least to some degree, a linear or a nonlinear analog circuit, as appropriate, can also be used to define the parameters as a function of the average temperature of the pipes 25.

It will be appreciated that changing the voltage on the gates of the FETs 130, 131 and 132 serve to change the drain-source resistance of the FETs and therefore causes an appropriate change in the desired welding parameter.

It will be appreciated that different welding operations may require slightly different welding parameters. Therefore, a replaceable ROM 123 could be used, whereby each ROM would have the characteristics desirable for a specified welding operation. Alternatively, the ROM 123 could contain tables for several different types of welding operations and the welding operator, through a switch, could instruct microprocessor 122 which table was to be used for the particular welding operation. However, the preferred implementation of this embodiment is to use a SETUP switch 133 in conjunction with three rotary switches 134, 135 and 136. When switch 133 is in the SETUP position, switches 134, 135 and 136 are used to set the desired pulse frequency, pulse width, and wire feed speed, respectively. Microprocessor 122 stores the settings of these switches. When switch 133 is in the OPERATE mode, microprocessor 122 uses the stored values to offset the parameter value specified by the lookup table in ROM 123. Alternatively, switches 133-136 would be used to specify certain physical characteristics, such as the pipe diameter, the pipe thickness, the pipe material, etc., which would cause microprocessor 122 to select a certain lookup table or to offset the values obtained by a lookup table when determining the welding parameters to be used. Therefore, the present invention accommodates different types of welding operations.

The values for the parameters in the lookup table in the ROM, and the particulars of any algorithm used to compute the parameters, are a function of the output voltage rating, output current rating, frequency and pulse width range, output inductor/resistor values, etc., of the particular type of electronic welder being used. Therefore, these values and particulars are determined by experimentation.

It will be appreciated from the above that the present invention describes a method and an apparatus for obtaining an optimum weld by maintaining the average temperature of the pipes to be welded together at a temperature which achieves good penetration and bonding while avoiding burn-through, The present invention provides a hotter arc for starting the welding operation so that good penetration and bonding will be obtained and, once the pipe temperature has reached a predetermined value, provides a cooler arc so that good penetration and bonding will continue to be obtained while avoiding the problems of burn-through.

Although the preferred embodiment of the present invention is used with a pulse MIG welder the present invention is not so limited. The present invention may also be used with other types of welders, especially non-pulsed (DC) MIG welders. Generally, out-of-position welding is more difficult when a non-pulsed MIG welder is used. If the present invention is implemented in a non-pulsed MIG welder then the pipe should be rotated about its longitudinal axis at a rate which maintains a fixed relationship between the welding torch and the pipe. Alternatively, welding may be performed at a number of selected positions around the pipe junction so that, for each position, a near-fixed relationship is obtained.

It will be appreciated that the welding arc provided by a non-pulsed MIG welder is very similar to the welding arc provided by a pulse MIG welder if the pulse MIG welder has a pulse frequency and an output inductance which are high enough to smooth the output of the welder. If the smoothing effect is large enough then the output of the welder will closely approximate a direct current.

It will also be appreciated that, when the present invention is used with a non-pulsed welder, weld parameter selection circuit 12 would adjust the welding voltage and welding current, rather than the pulse frequency and pulse width. In this case, controller 20 would cause weld parameter selection circuit 12 to vary the welding voltage and/or welding current so as to obtain the preferred arc characteristics and pipe temperature.

Furthermore, different embodiments of the present invention have been described which are responsive to the amount of time since the welding operation was started, the temperature of the pipe, and other characteristics of the welding operation. Furthermore, different embodiments of the present invention have been described which provide a step transition between the hotter arc and the cooler arc, or provide a tapered transition, which can be linear or non-linear, between the hotter arc and the cooler arc. Furthermore, some of the embodiments described above provide for increasing the temperature of the arc when the temperature of the pipe decreases below the desired temperature. From the above, other embodiments of and variations to the present invention will suggest themselves to those skilled in the art. Therefore, the present invention is to be limited only by the claims below.

What is claimed is:

1. A method for arc welding of a material, comprising:
    using a first set of welding parameters to begin a welding operation on said material;
    determining the occurrence of a selected temperature of said material exceeding a first predetermined temperature by measuring said selected temperature of said material, wherein said selected temperature is the average of the temperature at a first point on said material and a temperature at a second point on said material; and
    switching to a second set of welding parameters to continue said welding operation on said material;
    wherein said first predetermined temperature is independent of the temperature of said material.

2. The method of claim 1 wherein said welding parameters comprise at least one of the following: the pulse frequency, the pulse width, and the wire feed speed.

3. The method of claim 1 wherein said welding parameters comprise at least one of the following: the welding voltage, the welding current, and the wire feed speed.

4. The method of claim 1 wherein said selected temperature is the temperature at a selected point on said material.

5. The method of claim 1 wherein said first point and said second point are on opposite sides of said welding operation.

6. The method of claim 1 and further comprising the step of switching to said first set of parameters when said selected temperature falls below a second predetermined temperature.

7. The method of claim 6 wherein said first predetermined temperature is equal to said second predetermined temperature.

8. The method of claim 6 wherein said first predetermined temperature is greater than second predetermined temperature.

9. A method for arc welding of a material comprising:
    using a set of welding parameters to begin a welding operation on said material;
    monitoring a selected temperature of said material; and
    changing at least a selected one of said welding parameters in response to changes in said selected temperature;
    wherein said selected temperature is an average of the temperature at a first point on said material and the temperature at a second point on said material.

10. The method of claim 9 wherein said welding parameters comprise at least one of the following: the pulse frequency, the pulse width, and the wire feed speed.

11. The method of claim 10 wherein said step of changing comprises decreasing the pulse width as said selected temperature increases.

12. The method of claim 9 wherein said welding parameters comprise at least one of the following: the output voltage, the output current, and the wire feed speed.

13. The method of claim 9 wherein said selected temperature is the temperature at a selected point on said material.

14. The method of claim 9 wherein said first point and said second point are on opposite sides of said welding operation.

15. The method of claim 9 wherein said step of changing comprises decreasing the welding current as said selected temperature increases.

16. An arc welding apparatus for performing a welding operation on a material, comprising:
    first means for providing a control signal in a first state if an average temperature of said material is less than a first predetermined temperature and providing said control signal in a second state if said average temperature is greater than said first predetermined temperature, said first predetermined temperature being independent of the temperature of said material, said first means comprising a first temperature at a first point on said material, a second temperature measuring device for providing a second temperature signal responsive to the temperature at a second point on said material, means responsive to said first temperature signal and said second point on signal for providing said average temperature signal, and means for providing said control signal by comparing said average temperature signal to said first predetermined temperature;

second means responsive to said control signal being in said first state for providing a drive signal corresponding to a first set of welding parameters for beginning said welding operation on said material, and responsive to said control signal being in said second state for providing said drive signal corresponding to a second set of welding parameters for continuing said welding operation on said material; and third means responsive to said drive signal for providing welding power to said welding operation on said material.

17. The arc welding apparatus of claim 16 wherein said welding parameters comprise at least one of the following: the pulse frequency, the pulse width, and the wire feed speed.

18. The arc welding apparatus of claim 16 wherein said welding parameters comprise at least one of the following: the output voltage, the output current, and the wire feed speed.

19. The arc welding apparatus of claim 16 wherein said first temperature measuring device and said second temperature measuring device are placed on opposite sides of said welding operation.

20. The arc welding apparatus of claim 16 wherein said first means provides said control signal in said first state in response to said selected temperature being less than a second predetermined temperature.

21. The arc welding apparatus of claim 20 wherein said first predetermined temperature is equal to said second predetermined temperature.

22. The arc welding apparatus of claim 20 wherein said first predetermined temperature is greater than said second predetermined temperature.

23. An arc welding apparatus for performing a welding operation on a material, comprising:

first means responsive to a selected temperature of said material exceeding a first predetermined temperature for providing a control signal, said first means comprising a first temperature measuring device for providing a first temperature responsive to the temperature at a first point on said material, a second temperature measuring device for providing a second temperature signal responsive to the temperature at a second point on said material, and means responsive to an average of said first temperature and said second temperature exceeding said first predetermined temperature for providing said control signal, said first predetermined temperature being independent of the temperature of said material;

second means for providing a drive signal corresponding to a set of welding parameters, at least a selected on of said welding parameters being responsive to said control signal so that said arc welding apparatus provides an arc having characteristics desired for starting said welding operation and thereafter having characteristics desired for continuing said welding operation; and third means responsive to said drive signal for providing welding power to said arc for said welding operation on said material.

24. The arc welding apparatus of claim 23 wherein said welding parameters comprise at least one of the following: the pulse frequency, the pulse width, and the width feed speed.

25. The arc welding apparatus of claim 23 wherein said welding parameters comprise at least one of the following: the output voltage, the output current, and the wire feed speed.

26. The arc welding apparatus of claim 23 wherein said first temperature measuring device and said second temperature measuring device are placed on opposite sides of said welding operation.

* * * * *

UNITED STATES PATENT AND TRADEMARK OFFICE
CERTIFICATE OF CORRECTION

PATENT NO. : 5,136,139
DATED : August 4, 1992
INVENTOR(S) : Malcolm T. Gilliland It is certified that error appears in the above-indentified patent and that said Letters Patent is hereby corrected as shown below:

Column 10, line 39, "wherein said selected temperature is an average" should read --wherein said selected temperature is the average--. Column 11, lines 4 and 5, "a first temperature at a first point on said material" should read --a first temperature measuring device for providing a first temperature signal responsive to the temperature at a first point on said material--. Column 11, line 9, "said second point on signal for" should read --said second temperature signal for--. Column 11, line 40, "state in response to said selected temperature being less" should read --state in response to said average temperature being less--. Column 12, line 35, "width feed speed" should read --wire feed speed--.

Signed and Sealed this

Ninth Day of November, 1993

Attest:

BRUCE LEHMAN

*Attesting Officer*    *Commissioner of Patents and Trademarks*